March 9, 1954  H. H. CARLSON  2,671,381
TOOL FOR CORRUGATING FINGER HOLES IN BOWLING BALLS
Filed July 24, 1950
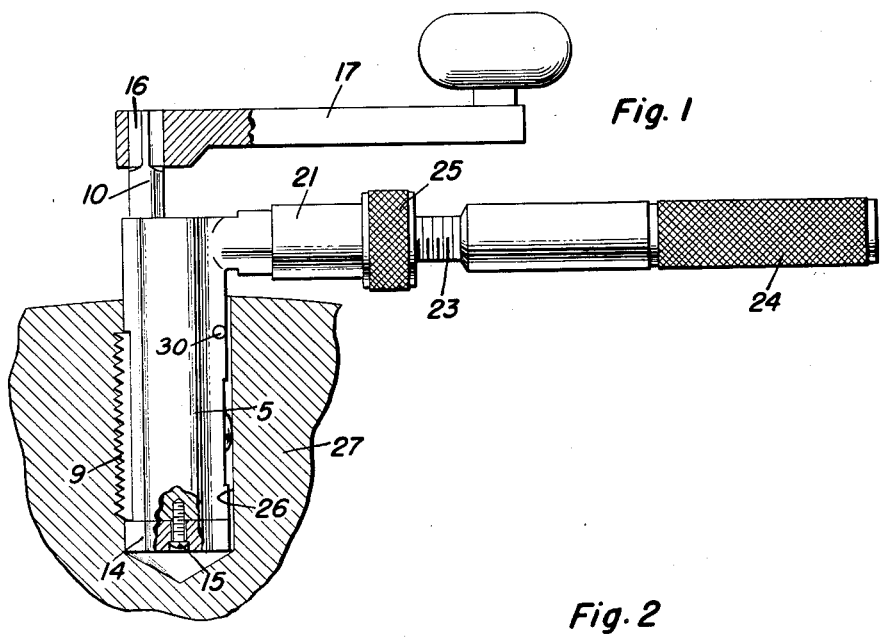
Fig. 1
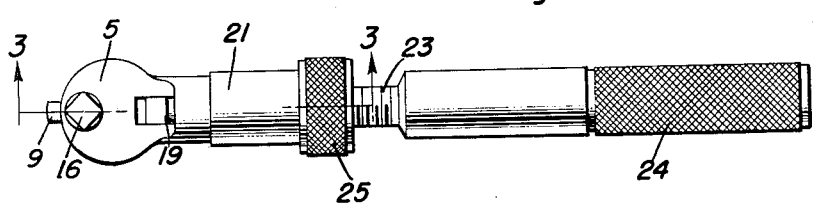
Fig. 2
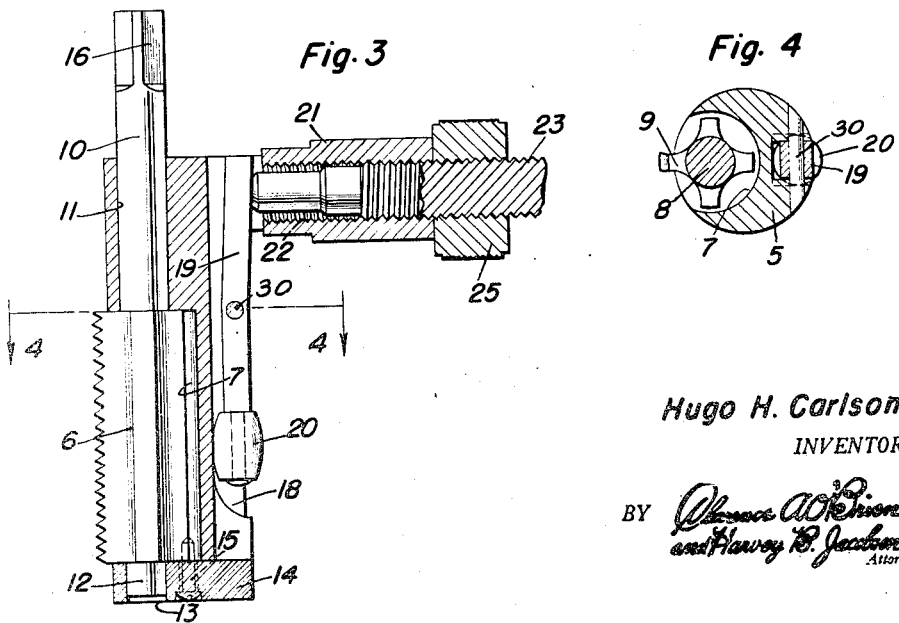
Fig. 3    Fig. 4
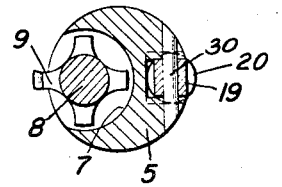
Hugo H. Carlson
INVENTOR.
BY
Attorneys Patented Mar. 9, 1954

2,671,381

UNITED STATES PATENT OFFICE 2,671,381

TOOL FOR CORRUGATING FINGER HOLES IN BOWLING BALLS

Hugo H. Carlson, Red Wing, Minn.

Application July 24, 1950, Serial No. 175,533

2 Claims. (Cl. 90—12)

The present invention relates to new and useful improvements in tools for forming circumferential grooves or corrugations in the finger-gripping openings in bowling balls to facilitate gripping of the ball by the fingers of a person.

An important object of the invention is to provide a tool of this character adapted for insertion in the finger-gripping opening of a bowling ball, after the opening has been formed therein, and whereby internal grooves or corrugations may be formed in the openings to improve the grip thereof.

A further object of the invention is to provide an internal groove or corrugation forming tool provided with a removable rotary cutter.

Another object of the invention is to provide internal pressure means to hold the rotary cutter in cutting position in the finger opening.

Another object is to provide pressure adjusting means whereby the internal pressure subjected to the cutter may be regulated as the cutting of the grooves or corrugations progresses.

A still further object is to provide a tool of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view with parts shown in section;

Figure 2 is a top plan view of the tool;

Figure 3 is an enlarged vertical sectional view taken on the line 3—3 of Figure 2; and Figure 4 is a transverse sectional view taken on the line 4—4 of Figure 3.

Referring now to the drawings in detail, wherein, for the purpose of illustration, I have disclosed a preferred embodiment of the invention, the numeral 5 designates a cylindrical body forming a mounting for a rotary cutter 6 positioned in a longitudinal recess 7 in one side of the body, the cutter comprising a hub portion 8 having rows of cutting teeth 9 projecting radially therefrom.

An upper shaft 10 is formed at one end of hub 8 and is journaled in a bore 11 formed eccentrically in the body or cutter mounting 5 and a lower shaft 12 extends from the opposite end of the hub 8 and is journaled in a bore 13 formed eccentrically in an end plate 14 secured to the lower end of body or mounting 5 by a screw 15, and by means of which the cutter is removably supported in the body or mounting 5.

The upper shaft 10 projects above the upper end of body or mounting 5 and is formed with a square upper end 16 by means of which a crank handle 17 is attached to the shaft for rotating the cutter.

A longitudinal groove 18 is formed in the body or cutter mounting 5 at a side thereof diametrically opposite from the recess 7 and in which a lever 19 is pivotally mounted on a pin 30 positioned transversely of the groove, the lever extending longitudinally in the groove and is provided with a roller 20 at its lower end.

A socket 21 projects radially from the upper end of body or cutter mounting 5 and is formed with a threaded bore 22 for a screw 23 having its inner end bearing against the upper end of lever 19. The outer end of screw 23 is formed with a knurled finger grip 24 for adjusting the screw inwardly and outwardly of socket 21 to adjust the position of roller 20 inwardly or outwardly of groove 18. A jam nut 25, threaded on the screw 23, locks the latter in its adjusted position.

In the operation of the device, the cutter 6 is mounted in recess 7 of the body or cutter mounting 5, the cutter being constructed so that its teeth 9 project outwardly from the periphery of the body or cutter mounting, as shown in Figure 4 of the drawings.

The tool is then inserted in a finger opening 26 of a bowling ball 27 and handle 17 is turned to rotate the cutter 6 to cut internal grooves or corrugations in one side of the finger opening 26.

Finger grip 24 for screw 23 holds the body or cutter mounting 5 from rotation during the cutting operation and may swing the body or cutter mounting 5 from side to side to partially rotate the latter to extend the internal groove cut in the finger opening 26 circumferentially thereof.

The teeth 9 are held in cutting engagement in the finger opening by feeding screw 23 inwardly of socket 21 to force the upper end of lever 19 inwardly and to force the roller 20 radially outwardly of groove 18 to subject the body or cutter mounting 5 to internal pressure at one side for forcing the cutter against the diametrically opposite side of the finger opening 26.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. An internal grooving tool comprising a cylindrical mounting having a longitudinal substantially cylindrical groove in one side and a hollow arm projecting laterally from one end portion of the mounting, a rotary cutter journaled in the groove eccentrically of the mounting and having cutting teeth projecting outwardly at one side of the mounting, a rockable lever pivoted longitudinally to a side of the mounting diametrically opposite from the cutter and positioned with one end of the lever bi-secting the inner end of the hollow arm, and pressure means adjustably carried internally of the arm and engaging said one end of the lever and adapted to force the other end of the lever against the work to hold the cutter in internal cutting engagement with the work.

2. An internal grooving tool comprising a cylindrical mounting having a longitudinal substantially cylindrical groove in one side and a hollow arm projecting laterally from one end portion of the mounting, a rotary cutter journaled in the groove eccentrically of the mounting and having cutting teeth projecting outwardly at one side of the mounting, a rockable lever pivoted longitudinally to a side of the mounting diametrically opposite from the cutter and positioned with one end of the lever bi-secting the inner end of the hollow arm, and a pressure screw threaded in the arm and engaging said one end of the lever for forcing the other end of the lever against the work to hold the cutter in internal cutting engagement with the work.

HUGO H. CARLSON.

References Cited in the file of this patent
UNITED STATES PATENTS

| Number | Name | Date |
|---|---|---|
| 303,524 | Lee | Aug. 12, 1884 |
| 522,403 | Calkins | July 3, 1894 |
| 1,430,933 | Brandt et al. | Oct. 3, 1922 |
| 1,457,193 | Smith | May 29, 1923 |
| 2,304,405 | Green | Dec. 8, 1942 |